United States Patent [19]
Whitworth

[11] 3,974,988
[45] Aug. 17, 1976

[54] THREE-WHEEL LANDING GEAR ASSEMBLY

[75] Inventor: Samuel Whitworth, Bellevue, Wash.

[73] Assignee: The Boeing Company, Seattle, Wash.

[22] Filed: Dec. 23, 1974

[21] Appl. No.: 535,848

[52] U.S. Cl. .............................................. 244/103 R
[51] Int. Cl.² ........................................ B64C 25/36
[58] Field of Search ........ 244/103 R, 102 R, 100 R, 244/104 R, 104 FP

[56] References Cited
UNITED STATES PATENTS

| | | | |
|---|---|---|---|
| 2,579,180 | 12/1951 | Eldred | 244/104 FP |
| 2,750,134 | 6/1956 | Hawkins et al. | 244/102 R |
| 2,755,041 | 7/1956 | Lewis | 244/102 R |
| 2,842,326 | 7/1958 | Sharples | 244/103 R |
| 3,323,761 | 6/1967 | Copeland et al. | 244/102 R |
| 3,533,581 | 10/1970 | Leclercq | 244/104 R |
| 3,652,040 | 3/1972 | Hartel | 244/104 R |

FOREIGN PATENTS OR APPLICATIONS 748,555    5/1956    United Kingdom

Primary Examiner—Stephen G. Kunin
Assistant Examiner—Barry L. Kelmachter
Attorney, Agent, or Firm—Christensen, O'Connor, Garrison & Havelka

[57] ABSTRACT

Disclosed is an aircraft landing gear assembly comprising a shock strut and three-wheel truck depending therefrom. The truck comprises a rigid, U-shaped frame including two parallel side beams spaced apart on opposite sides of the strut and interconnected at their forward ends by a downwardly offset end beam in the form of a torque tube. Two coaxial forward wheels are mounted outboard of and on opposite sides of the forward end of the truck. An aft wheel is mounted on an axle rigidly interconnecting the aft ends of the side beams. The lower end of the shock strut is disposed between the forward ends of the side beams and includes two rearwardly diverging arms, the divergent ends of which are connected to the side beams in such a manner that the truck is rotatable about an axis passing through the connection points between the arms and the side beams.

14 Claims, 5 Drawing Figures

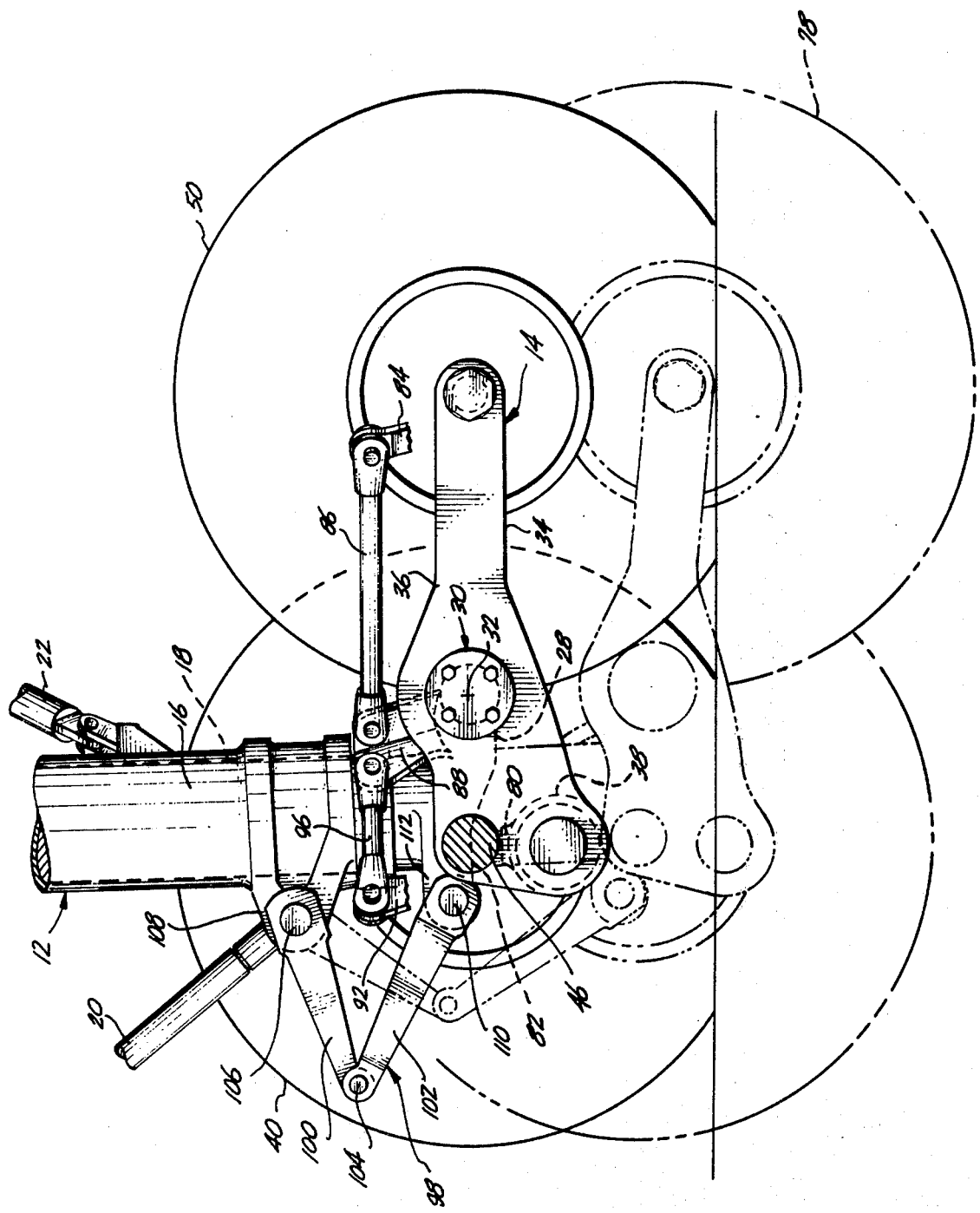

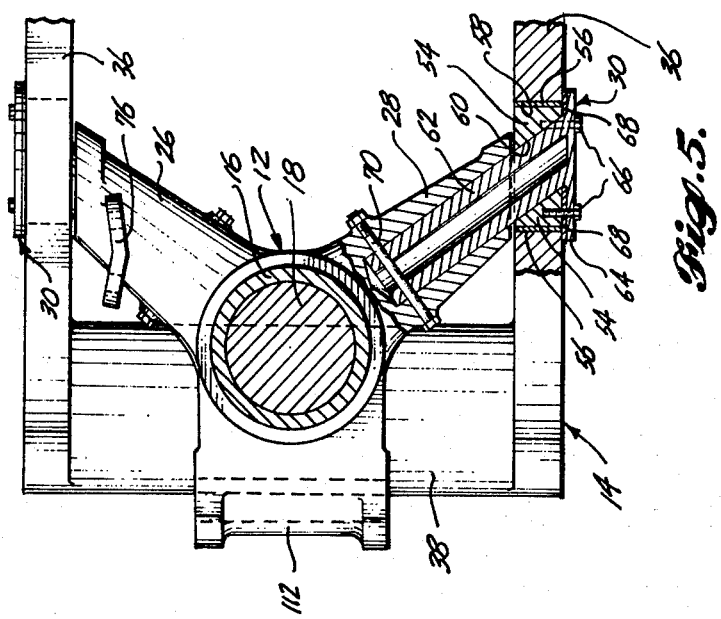

3,974,988

THREE-WHEEL LANDING GEAR ASSEMBLY

BACKGROUND OF THE INVENTION

This invention relates to an aircraft landing gear and, more particularly, to a three-wheeled landing gear assembly wherein the wheels are disposed in a triangular array. The three-wheel landing gears of this invention can be constructed so as to be comparable to conventional two-wheel landing gears in size, weight and blow-out safety, and yet capable of bearing substantially greater loads. The landing gears of this invention can therefore be incorporated into existing or "stretched" aircraft designs to provide a larger "footprint" and to accommodate higher operating weights without requiring extensive redesign of wing and/or wheel well structures.

SUMMARY OF THE INVENTION

In summary, this invention is directed to an aircraft landing gear assembly comprising a shock strut and a three-wheeled truck depending from the lower end thereof. The truck comprises a rigid, generally U-shaped frame including two, preferably parallel, side beams spaced apart on opposite sides of the strut and an end beam (preferably taking the form of a torque tube) extending between and rigidly interconnecting the forward ends of the side beams. Two substantially coaxial forward wheels are mounted outboard of and on opposite sides of the forward end of the truck. An aft wheel is mounted between the aft ends of the truck side beams. The aft wheel is preferably mounted on an axle extending between and rigidly interconnecting the aft ends of the side beams with the forward edge of the aft wheel being positioned substantially forward of the aft edges of the forward wheels. (As used herein and in the appended claims, the term "wheel" refers to a wheel rim and associated tire.) Connection means connect the lower end of the strut to each of the side beams at locations between the rotational axes of the forward wheels and aft wheel, the manner of connection being such that the side beams (and hence the truck) are rotatable about an axis passing through the connection points between the arms and side beams. Preferably, the connections between the strut and the side beams are so located as to distribute a load borne by the assembly substantially evenly among the three wheels.

It is preferred that the lower end of the strut be disposed between the forward ends of the side beams and include two rearwardly diverging arms, the divergent ends of the arms being connected to the side beams by the connection means. A preferred connection means comprises a shaft coaxially engaged with the divergent end of one of the arms and a cylindrical, tubular block disposed in a side beam such that the side beam is rotatable therearound. The shaft extends through the block and is connected thereto. Typically, the shock strut will comprise coaxial inner and outer cylinders, the inner cylinder being translatable axially within the outer cylinder and the truck depending from the inner cylinder. Preferably, a torque linkage interconnects the lower end of the inner cylinder to the outer cylinder so as to prevent relative rotation therebetween but allow the inner cylinder to translate axially within the outer cylinder.

BRIEF DESCRIPTION OF THE DRAWINGS

FIG. 3 is a side elevation view of the landing gear assembly of FIG. 2 with the forward, near-side wheel removed for clarity.

FIG. 4 is a simplified isometric view of the shock strut and truck of the landing gear assembly of FIG. 1, with wheels, torque links and brake linkages removed for clarity.

FIG. 5 is a partially cross-sectioned partial plan view along lines 5—5 of FIG. 4.

DESCRIPTION OF THE PREFERRED EMBODIMENTS

Figure 1:
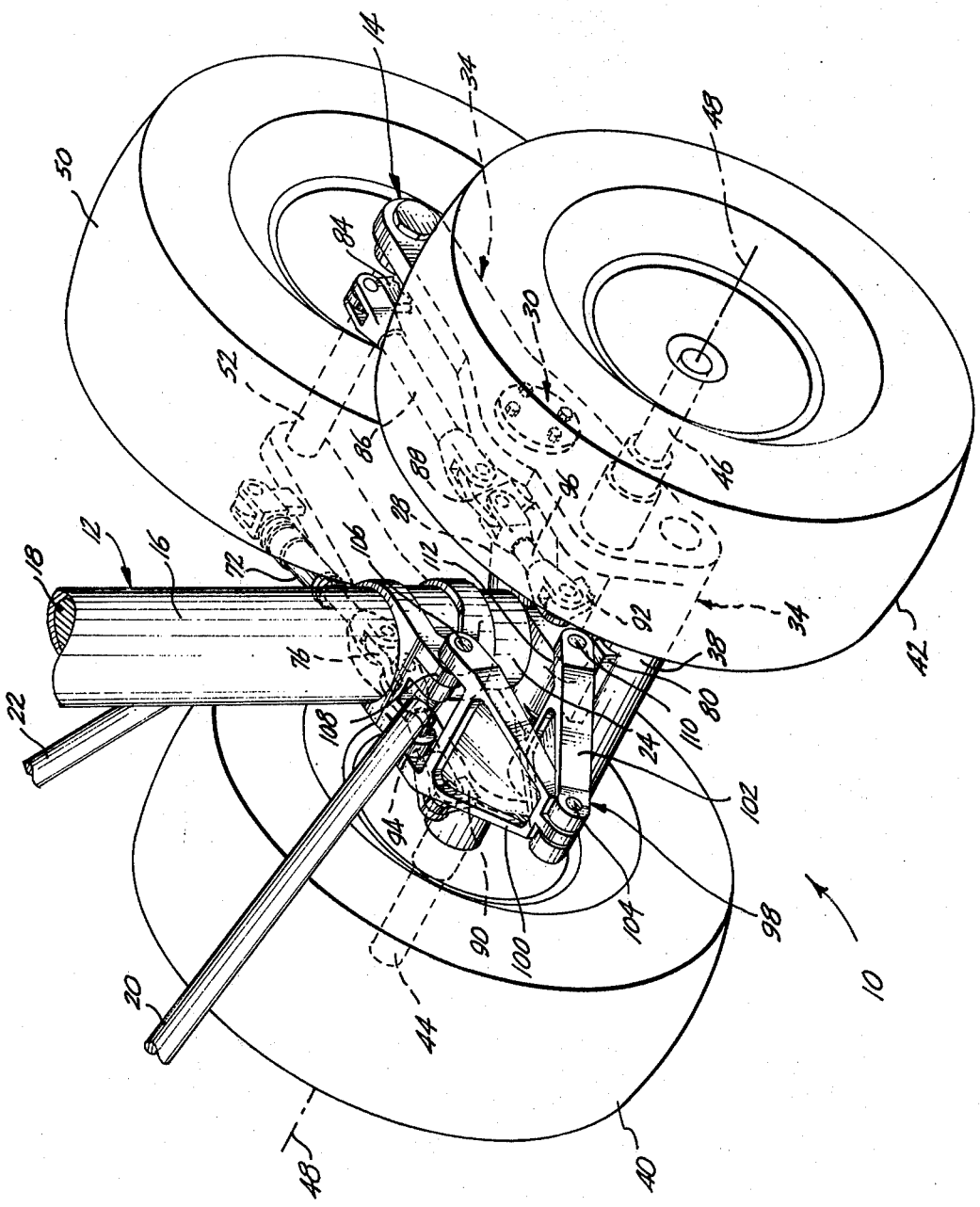
FIG. 1 is a isometric view of the preferred three-wheeled landing gear assembly of this invention.

The preferred embodiment of the landing gear of this invention which is shown in the drawings, was specifically designed for lateral extension from and retraction into a wheel well which was of limited length and situated in the body of an aircraft. However, it may be employed in any appropriate aircraft or wing configuration.

Referring to the drawings, the landing gear 10 is comprised of a shock strut 12 and a three-wheeled truck 14 depending from the lower end thereof. The shock strut includes concentric outer and inner cylinders 16 and 18, respectively. To the outer cylinder 16 is connected a conventional drag strut 20 serving as a brace against forces applied to the gear in a force and aft direction. Also connected to the outer cylinder is a conventional side strut 22 serving as a brace against side forces applied to the gear. The outer cylinder 16 houses a conventional oleo shock absorber (not shown in the drawings), with the inner cylinder 18 forming the oleo strut of the shock absorber. Variations in loads exerted on the outer cylinder cause the inner cylinder to translate axially within the outer cylinder through a limited span against the cushioning effect of the shock absorber.

The exposed lower end 24 of the inner cylinder 18 is formed or otherwise provided with a pair of rearwardly diverging arms 26 and 28. The truck 14 is connected to the divergent ends of the arms by bearing block assemblies 30 (described in detail hereinafter) which assemblies permit the truck and associated wheels to rotate through a limited span about an axis indicated by dot-dash line 32.

The truck 14 is comprised of a rigid, generally U-shaped frame 34 (shown most clearly in FIG. 4) which includes two parallel side beams 36 spaced apart on opposite sides of the shock strut 12. The side beams are rigidly interconnected at their forward ends by a downwardly offset end beam which, in the preferred embodiment shown, is in the form of a torque tube 38.

Two forward wheels 40 and 42 are mounted independently and substantially coaxially on spindles 44 and 46, respectively, extending outboard of and on opposite sides of the forward end of the truck 14. The forward wheels have a common rotational axis indicated by dot-dash line 48, which axis is in the same vertical plane as the axis 49 of the torque tube 38; the plane through which the wheel loads are transferred in the event of a blow-out. The aft wheel 50 is mounted behind and between the forward wheels on an axle 52 extending between and rigidly interconnecting the aft ends of the side beams 36. The forward edge of the aft wheel is disposed substantially forward of the aft edges of the forward wheels between the arms 26 and 28 on the lower end 24 of the inner cylinder 18 so that the gear is compact in fore and aft dimension.

FIG. 5 illustrates the details of the two bearing block assemblies 30 by which the side beams 36 of the truck 14 and the diverging arms 26 and 28 of the inner cylinder 18 are interconnected. Each assembly includes a bearing block comprised of a steel bearing block core 54 surrounded by a bearing sleeve 56 formed of ali-nickel bronze. The exterior shape of the block is right circular cylindrical and it fits into a mating circular hole 58 in the side beam. Each side beam is rotatable relative to the associated bearing block about the axis 32 passing through the centers of the blocks. A hole 60 extends through the bearing block core at an angle to the cylindrical axis of the block, the angle being the same as the angle between the arm 28 and the side beam 36. The assembly also includes a hollow shaft 62, the outer end of which extends through the hole in the bearing block and terminates in an integral circular end plate 64 disposed on the outboard side of and parallel to the side beam 36. The end plate is connected to the bearing block core 54 by four screws 66. A disc-shaped spacer 68 (formed of ali-nickel bronze) disposed between the end plate 64 and the bearing block core 54 maintains a slight separation between the side beam and the periphery of the end plate. The inner end of the hollow shaft is coaxially engaged within the hollow interior of the arm 28, and is connected to the arm by bolt 70.

The load borne by the gear is transmitted from the shock strut through the bearing block assemblies to the side beams of the truck. The bearing block assemblies are located so that the load is distributed substantially equally among the three wheels.

Figure 2:
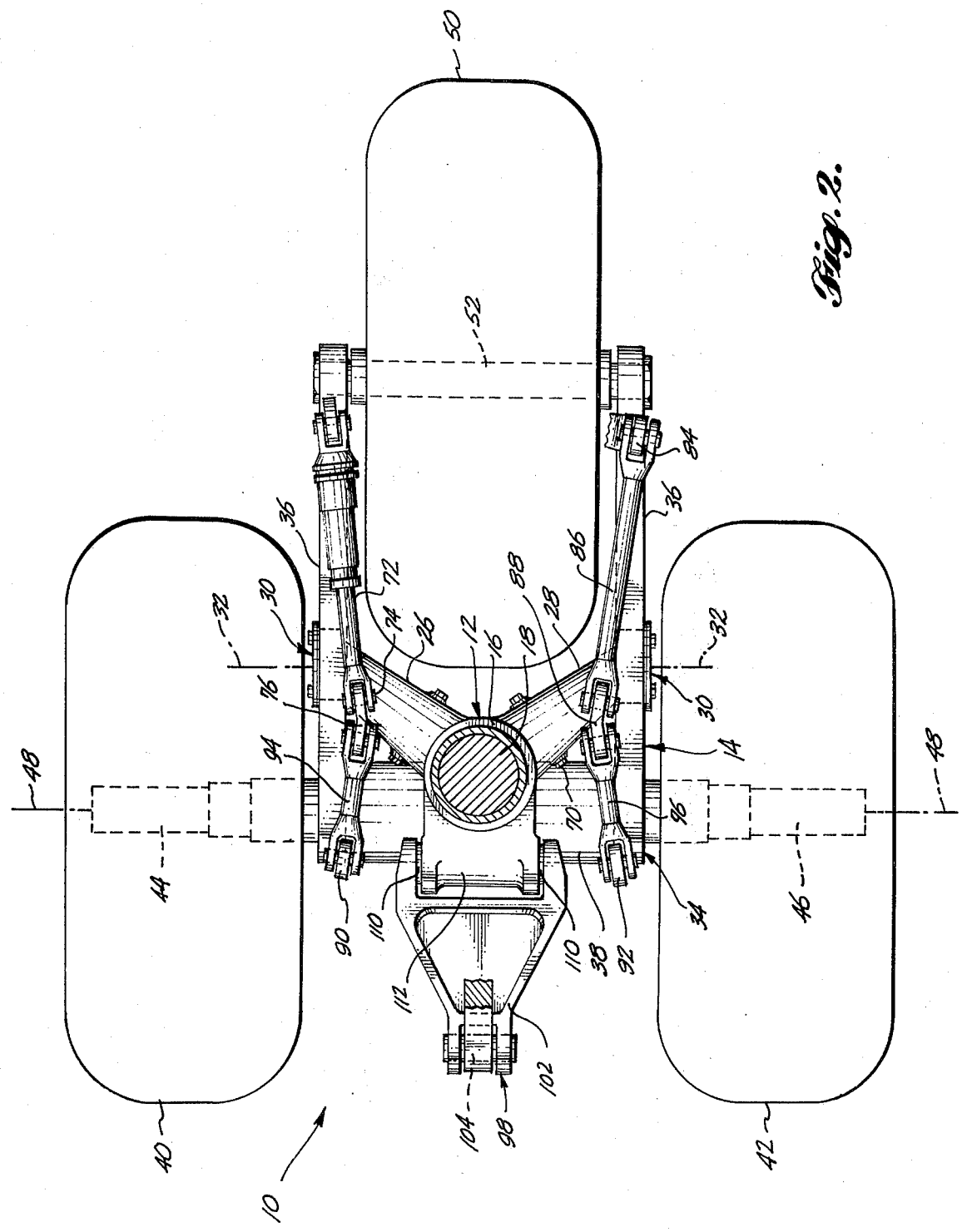
FIG. 2 is a plan view of the landing gear assembly of FIG. 1.

Rotation of the truck in a direction tending to elevate the aft wheel relative to the forward wheels is limited by a truck positioner link 72 (see FIG. 2) connected at its forward end by a pin 74 to a flange 76 on one of the diverging arms and connected at is aft end by another pin to a flange on the aft end of one of the side beams. The truck positioner link includes a compressed spring (not shown) which urges the truck to rotate in a direction tending to lower the aft wheel relative to the forward wheels such that when the gear is not bearing a load, the truck rotates until the wheel is in a position slightly below the forward wheels as shown by a dot-dash line 78 in FIG. 3 (this position being the necessary one for storage in the wheel well of the aircraft for which the preferred embodiment of this invention was designed). At that point a projection 80 on the top of the torque tube 38 engages the underside 82 of the inner cylinder and prevents further rotation of the truck.

Each of the three wheels on the truck is equipped with a conventional steel brake (not shown). A brake lever arm 84 for the rear wheel brake (only partially shown) is pivotally connected to a brake reaction link 86 which is in turn pivotally connected to a flange 88 of the shallow V-cross section mounted on one of the arms on the lower inner cylinder. The brake lever arms 90 and 92 for the forward wheel brakes are pivotally connected to reaction links 94 and 96 which are in turn pivotally connected to the flanges 76 and 88, respectively, on the arms of the inner cylinder. Oscillations of the truck and wheels do not affect the operation of the brakes.

A torque linkage 98 interconnects the inner and outer cylinders of the shock strut. This linkage consists of two links 100 and 102 interconnected by a pin 104. One end of the linkage is connected by a second pin 106 to a bracket 108 on the outer cylinder to which the drag strut 20 is also connected. The other end is connected by a third pin 110 to a torque linkage flange 112 protruding forwardly on the lower end of the inner cylinder. The torque linkage prevents rotation of the inner cylinder relative to the outer cylinder (and hence, when the gear is extended, maintains the truck and wheels in alignment with the longitudinal axis of the aircraft) and yet permits axial movement of the inner cylinder relative to the outer cylinder over the entire stroke of the shock absorber.

The landing gear of the present invention simply and uniquely provides built-in compensation for any single or dual blow-out situation. Referring to FIG. 3, it can be seen that a blow-out of the rear tire would remove support from the rear axle 52, causing the truck assembly 14 to rotate until the projection 80 on the top of the torque tube 38 engages against the underside of the torque linkage bracket 112 of the inner cylinder. The load borne by the gear would then be shared equally by the forward wheels.

In the case of a blow-out of one of the forward tires, the truck remains stable due to its rigidity and the manner in which it is connected to the shock strut. The load previously borned by the blown-out tire is shared between the other forward tire and the aft tire. In a more extreme circumstance of the simultaneous blow-out of one forward tire and the aft tire, loads would be transferred to the remaining forward wheel. In the most extreme circumstance of the simultaneous blow-out of both forward tires, the truck would rotate until the forward end was lowered relative to the aft end until the forward wheel rims contacted the ground and shared the load with the aft wheel.

While the preferred embodiments of this invention have been illustrated and described, various modifications and equivalents will be apparent to those skilled in the art. The appended claims are intended to cover all modifications and equivalents that fall within the true spirit and scope of this invention.

What is claimed is:

1. A three-wheeled aircraft landing gear assembly comprising a shock strut having a lower end and a truck depending from the lower end of the strut; the truck having a forward end and an aft end and comprising a rigid, generally U-shaped frame including two side beams spaced apart on opposite sides of the strut and an end beam extending between and interconnecting the forward ends of the side beams; two substantially coaxial forward wheels mounted outboard of and on opposite sides of the forward end of said frame; an aft wheel and means mounting the wheel between aft ends of the side beams; and connection means connecting the lower end of the strut to each of the side beams at locations between the rotational axes of the forward wheels and the aft wheel, the connection means permitting rotation of the side beams in vertical planes about a common rotational axis.

2. The landing gear assembly of claim 1 wherein the lower end of the strut includes two rearwardly diverging arms, the divergent ends of which are connected to the side beams by the connection means.

3. The landing gear assembly of claim 2 wherein the connection means comprises two bearing assemblies, each assembly connecting an arm to a side beam and each comprising a shaft coaxially engaged with the divergent end of the arm, a cylindrical, tubular block disposed in the side beam such that the side beam is rotatable therearound, the shaft extending through the block and being connected thereto.

4. The landing gear assembly of claim 1 wherein the strut comprises coaxial inner and outer cylinders, the inner cylinder being translatable axially within the outer cylinder and the truck depending from the inner cylinder.

5. The landing gear assembly of claim 4 further comprising two rearwardly diverging arms connected to and extending aft from the lower end of the inner cylinder, the divergent ends of the arms being connected to the side beams by the connection means.

6. The landing gear assembly of claim 5 wherein the connection means comprises two bearing assemblies, each assembly connecting an arm to a side beam and each comprising a shaft coaxially engaged with the divergent end of the arm, a cylindrical, tubular block disposed in the side beam such that the side beam is rotatable therearound, the shaft extending through the block and being connected thereto.

7. The landing gear assembly of claim 1 wherein the means mounting the aft wheel comprises an axle extending between and rigidly interconnecting the aft ends of the side beams.

8. The landing gear assembly of claim 1 wherein the lower end of the strut is disposed between the forward ends of the side beams.

9. The landing gear assembly of claim 1 wherein the end beam of the truck defines a first surface and the strut defines a second surface, which surfaces are so disposed that upon rotation of the truck in a direction tending to lower the aft wheel below the forward wheels, the surfaces abut against one another and limit such rotation of the truck.

10. A landing gear assembly of claim 1 wherein the connections between the strut and the side beams are so located as to distribute a load borne by the assembly substantially evenly among the three wheels.

11. The landing gear assembly of claim 1 wherein the forward edge of the aft wheel is disposed substantially forward of the aft edges of the forward wheels.

12. The landing gear assembly of claim 8 wherein the lower end of the strut includes two rearwardly diverging arms, the divergent ends of which are connected to the side beams by the connection means.

13. The landing gear assembly of claim 8 wherein the strut comprises coaxial inner and outer cylinders, the inner cylinder being translatable axially within the outer cylinder and the truck depending from the inner cylinder.

14. The landing gear assembly of claim 13 further comprising two rearwardly diverging arms connected to and extending aft from the lower end of the inner cylinder, the divergent ends of the arms being connected to the side beams by the connection means.

* * * * *